US008921731B2

(12) United States Patent
Krink et al.

(10) Patent No.: US 8,921,731 B2
(45) Date of Patent: Dec. 30, 2014

(54) PROTECTIVE NOZZLE CAP, PROTECTIVE NOZZLE CAP RETAINER, AND ARC PLASMA TORCH HAVING SAID PROTECTIVE NOZZLE CAP AND OR SAID PROTECTIVE NOZZLE CAP RETAINER

(75) Inventors: Volker Krink, Finsterwalde (DE); Frank Laurisch, Finsterwalde (DE); Timo Grundke, Finsterwalde (DE); Martin Kroschwald, Groβschirma (DE)

(73) Assignee: Kjellberg Finsterwalde Plasma und Maschinen GmbH, Finsterwalde (DE)

( * ) Notice: Subject to any disclaimer, the term of this patent is extended or adjusted under 35 U.S.C. 154(b) by 402 days.

(21) Appl. No.: 13/390,234

(22) PCT Filed: Aug. 4, 2010

(86) PCT No.: PCT/DE2010/000921

§ 371 (c)(1),
(2), (4) Date: Feb. 24, 2012

(87) PCT Pub. No.: WO2011/018070

PCT Pub. Date: Feb. 17, 2011

(65) Prior Publication Data

US 2012/0138580 A1 Jun. 7, 2012

(30) Foreign Application Priority Data

Aug. 11, 2009 (DE) ......................... 10 2009 037 376

(51) Int. Cl.
*B23K 10/00* (2006.01)
*H05H 1/34* (2006.01)
*H05H 1/28* (2006.01)

(52) U.S. Cl.
CPC . *H05H 1/34* (2013.01); *H05H 1/28* (2013.01); *H05H 2001/3457* (2013.01)
USPC .............. 219/121.5; 219/121.49; 219/121.51; 219/75; 313/231.51

(58) Field of Classification Search
CPC .............. H05H 1/26; H05H 1/34; H05H 1/28
USPC ......... 219/121.5, 121.51, 121.48, 121.49, 74, 219/75; 313/231.51; 315/111.51
See application file for complete search history.

(56) References Cited

U.S. PATENT DOCUMENTS 3,629,547 A * 12/1971 Kester et al. .................. 219/120
4,967,055 A * 10/1990 Raney et al. ............... 219/121.5

(Continued)

FOREIGN PATENT DOCUMENTS

DE 214 318 B 10/1984
DE 27 55 461 C2 11/1988

(Continued)

OTHER PUBLICATIONS

International Search Report for PCT/DE2010/000921, Dec. 15, 2010.

(Continued)

*Primary Examiner* — Mark Paschall

(74) *Attorney, Agent, or Firm* — Jonathan M. D'Silva; MacDonald, Illig, Jones & Britton LLP

(57) ABSTRACT

A nozzle protection cap for an arc plasma torch comprises a front end section and a rear end section with a thread region on its inner surface for screwing to a torch body of an arc plasma torch. At least one groove crosses the thread region on the inner surface. A nozzle protection cap holder for the arc plasma torch comprises a section with a thread region on its outer surface for screwing to the nozzle protection cap. At least one groove crosses the thread region on its outer surface. An arc plasma torch comprises a torch body and a nozzle protection cap screwed thereto in a screw connection region. The torch body and/or the nozzle protection cap is/are designed so that at least one channel is formed between them, the channel crossing the screw connection region.

16 Claims, 8 Drawing Sheets

(56) References Cited

U.S. PATENT DOCUMENTS

| | | | | |
|---|---|---|---|---|
| 5,362,938 | A | 11/1994 | McGee et al. | |
| 5,393,952 | A * | 2/1995 | Yamaguchi et al. | 219/121.5 |
| 5,440,094 | A | 8/1995 | Zapletal | |
| 5,440,100 | A * | 8/1995 | Stuart et al. | 219/137.31 |
| 5,569,397 | A * | 10/1996 | Tsurumaki et al. | 219/121.51 |
| 5,906,758 | A | 5/1999 | Severance, Jr. | |
| 2009/0230095 | A1 | 9/2009 | Liebold et al. | |
| 2009/0230097 | A1 | 9/2009 | Liebold et al. | |

FOREIGN PATENT DOCUMENTS

| | | | |
|---|---|---|---|
| DE | 10 2004 049 445 | A1 | 4/2006 |
| DE | 10 2007 005 316 | B4 | 12/2009 |
| EP | 0 573 653 | A1 | 12/1993 |
| EP | 0 629 106 | A1 | 12/1994 |
| WO | WO 2010/073223 | A1 | 7/2010 |

OTHER PUBLICATIONS

Statement of Relevance: The International Search Report cites US 5,362,938 (“D1”), EP 573 653 A1 (“D2”), and WO 2010/073223 A1 (“D3”), Dec. 15, 2010.

English Translation of DE 10 2007 005 316 B4; Publication Date: Dec. 3, 2009; Applicant: Kjellberg Finsterwalde Plasma und Maschinen GmbH.

* cited by examiner

PROTECTIVE NOZZLE CAP, PROTECTIVE NOZZLE CAP RETAINER, AND ARC PLASMA TORCH HAVING SAID PROTECTIVE NOZZLE CAP AND OR SAID PROTECTIVE NOZZLE CAP RETAINER

BACKGROUND

The present invention relates to a nozzle protection cap for an arc plasma torch. The arc plasma torch can be used both for dry cutting and underwater cutting of different metal workpieces.

During plasma cutting, an arc (pilot arc) is first ignited between a cathode (electrode) and anode (nozzle) and then directly transferred to a workpiece in order to carry out cutting.

The arc produces a plasma which is a highly heated, electrically conductive gas (plasma gas) consisting of positive and negative ions, electrons as well as excited and neutral atoms and molecules. By way of plasma gas, gases such as argon, hydrogen, nitrogen, oxygen or air are used. These gases are ionised and disassociated through the energy of the arc. The plasma beam produced is used to cut the workpiece.

A modern arc plasma torch consists largely of base components such as a torch body, electrode (cathode), nozzle, one or a plurality of caps such as the nozzle cap and nozzle protection cap, which surround the nozzle, and connections which are used to supply the arc plasma torch with power, gases and/or liquids. Nozzle protection caps can be used to protect the nozzle during the cutting process against the heat and sprayed-out molten metal of the workpiece.

The nozzle can consist of one or more components. With directly water-cooled arc plasma torches the nozzle is held by a nozzle cap. Cooling water flows between the nozzle and the nozzle cap. A secondary gas then flows between the nozzle cap and nozzle protection cap. This serves for the creation of a defined atmosphere, for tapering the plasma beam, and for protection against spraying during penetration.

In the case of gas-cooled arc plasma torches and indirectly water-cooled arc plasma torches, the nozzle cap can be omitted. The secondary gas then flows between the nozzle and nozzle protection cap.

The electrode and the nozzle are arranged relative to each other in a certain spatial relationship and define a space, the plasma chamber, in which the plasma beam is produced. The plasma beam can be greatly influenced in its parameters, such as, for example, diameter, temperature, energy density and through-flow rate of the plasma gas, through the design of the nozzle and electrode.

Electrodes and nozzles are produced from different materials and in different forms for different plasma gases. They are generally produced from copper and directly or indirectly water-cooled. Depending upon the cutting task and electric power of the arc plasma torch, nozzles are used which have different inner contours and openings with different diameters and thus provide optimum cutting results.

For example German Document DE 10 2004 049 445 A1 shows an arc plasma torch with a water-cooled electrode and nozzle and a gas-cooled nozzle protection cap. The secondary gas is fed through a nozzle protection cap holder inside past a screw connection region between the nozzle protection cap holder and a nozzle protection cap through a secondary gas channel formed between the nozzle protection cap and a nozzle cap to a plasma beam.

European Document EP 0 573 653 B1 relates to an arc plasma torch with a water-cooled electrode and nozzle and also a water-cooled nozzle protection cap. As in the case of the arc plasma torch disclosed in DE 10 2004 049 445 A1, in EP 0 573 653 B1 a secondary gas is fed within a nozzle protection cap holder inside past a screw connection region between the nozzle protection cap holder and a nozzle protection cap to a plasma beam. Also as in the arc plasma torch disclosed in DE 10 2004 049 445 A1, the arc plasma torch of EP 0 573 653 B1 comprises insufficient cooling of the nozzle protection cap for certain applications.

In addition, the arc plasma torch of EP 0 573 653 B1 is designed so that an annular cooling water chamber is formed within the base end region of the nozzle protection cap. Flowing cooling water cools the nozzle protection cap. This structure has the additional disadvantage that upon unscrewing the nozzle protection cap, the cooling water leaves the cooling chamber and drips or runs on to the outer surface of the nozzle cap and the inner surface of the nozzle protection cap. This gives rise to cooling medium residue in the secondary gas chamber formed by the nozzle cap and the nozzle protection cap, which both impairs cutting quality and operational security and also leads to loss of cooling medium.

SUMMARY

It is thus an object of the invention to improve the cooling of the nozzle protection cap of an arc plasma torch. This is achieved according to the invention through a nozzle protection cap for an arc plasma torch comprising a front end section and a rear end section with a thread region on its inner surface for screwing into a torch body of an arc plasma torch, with at least one groove crossing the thread region on the inner surface.

This object is further realized through a nozzle protection cap holder for an arc plasma torch, comprising a section with a thread region on its outer surface for screwing into a nozzle protection cap of an arc plasma torch, with at least one groove crossing the thread region on its outer surface.

This object is also achieved through an arc plasma torch comprising a torch body and a nozzle protection cap screwed thereto in a screw connection region, the torch body and/or the nozzle protection cap being designed so that at least one channel is formed between them which crosses the screw connection region.

In the nozzle protection cap, it is contemplated that the thread region can be designed for screwing into the torch body via a nozzle protection cap holder.

According to some contemplated embodiments of the invention, at least one groove or grooves cross the thread region parallel to the longitudinal axis of the nozzle protection cap. Alternatively, at least one groove or grooves can cross the thread region obliquely to the longitudinal axis of the nozzle protection cap. It can also be provided that the groove or grooves cross the thread region in the manner of a screw.

In some contemplated embodiments, the nozzle protection cap can be constructed in two parts. Such construction allows just one worn part to be replaced if needed.

In some contemplated embodiments, a nozzle protection cap holder can be provided where the groove or grooves cross the thread region parallel to the longitudinal axis of the nozzle protection cap.

According to some embodiments of the invention, at least one groove or grooves cross the thread region obliquely to the longitudinal axis of the nozzle protection cap. In other embodiments, the at least one groove or grooves cross the thread region in the manner of a screw. In some contemplated embodiments of the arc plasma torch, the nozzle protection cap is screwed in the screw connection region via a nozzle protection cap holder.

At least one channel or channels are preferably formed from a groove in the torch body or nozzle protection cap holder and/or a groove in the nozzle protection cap. It can be provided in particular that the channel is a secondary medium channel. The secondary medium can, for example, be a liquid such as water or oil, or a gas such as water vapour. It can therefore be provided that the secondary medium channel is a secondary gas channel.

In some contemplated embodiments, a secondary medium inlet channel can be provided in the torch body, in particular in the nozzle protection cap holder, which is connected to at least one secondary medium channel or channels.

It is also contemplated that the arc plasma torch can be both a water-cooled or gas-cooled arc plasma torch having regard to the electrode and nozzle. The nozzle protection cap can be water-cooled or gas-cooled.

The invention is based upon the surprising discovery that upon use with, for example a secondary gas, improved cooling of the nozzle protection cap is achieved by feeding the secondary gas through the screw connection region. At the same time, symmetry and thus homogeneity of the secondary gas in the whole region are improved, resulting in improved cutting results. In some cases it is even possible for a secondary gas guiding component to be omitted. In addition, operational security is also improved. When using the invention with a secondary gas, advantages such as tapering of the plasma beam, protection of the nozzle from highly spraying metal during penetration, creation of a defined atmosphere around the plasma beam, and active participation of the secondary gas in the plasma process are realized while simultaneously securing stability of the plasma beam.

BRIEF DESCRIPTION OF THE DRAWINGS

Further features and advantages of the invention will be best understood from the claims and the following Detailed Description, in which several embodiments are explained individually by reference to the schematic drawings, in which:

DETAILED DESCRIPTION

Figure 1:
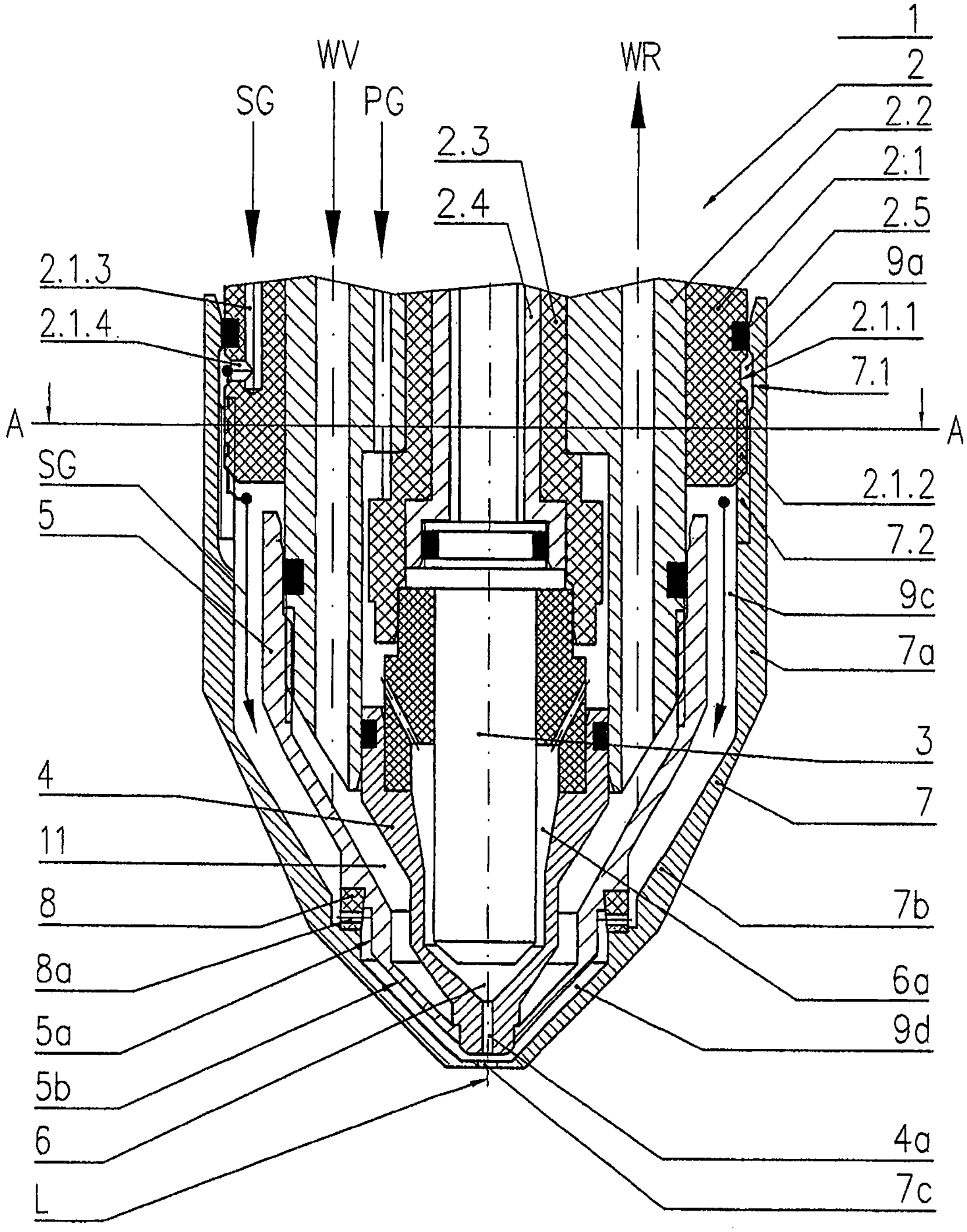
FIG. 1 depicts a longitudinal sectional view of an arc plasma torch according to one embodiment of the invention.

FIG. 1 shows an arc plasma torch according to one contemplated embodiment of the invention. The arc plasma torch 1 comprises a torch body 2 which includes a nozzle protection cap holder 2.1, a nozzle holder 2.2, an insulating member 2.3 and an electrode holder 2.4. An electrode 3 and a nozzle 4 are arranged in the torch 2 coaxially with the longitudinal axis L of the torch body and at a spatial distance, forming a plasma chamber 6, through which a plasma gas PG flows which is fed via a plasma gas channel 6*a*. A nozzle cap 5 is arranged coaxially with the longitudinal axis L of the plasma torch 1 and holds the nozzle 4. There is a space 11 between the nozzle 4 and a nozzle cap 5, through which space 11 cooling water flows. The cooling water is fed via a water supply WV and flows away via a water return WR. A nozzle protection cap 7, which is formed in one part as shown and consists of a rear section 7*a* and a front section 7*b* with an outlet opening 7*c*, is arranged coaxially with the longitudinal axis L of the plasma torch 1 and surrounds the nozzle cap 5 and the nozzle 4. It is connected to the plasma torch 1 via a thread region with an inner thread 7.2 and with an outer thread 2.1.2 of the protection cap holder 2.1. The nozzle protection cap 7 can consist of a highly heat conductive material such as copper, brass or aluminum.

A secondary gas SG flows through a secondary gas inlet channel 2.1.3 and an orifice 2.1.4 perpendicularly into a circular space 9*a* formed by the outer surface 2.1.1 of the nozzle protection cap holder 2.1 and the inner surface 7.1 of the nozzle protection cap 7 and is distributed. To the rear, the space 9*a* is sealed with an O-ring 2.5. The secondary gas SG then flows through the secondary gas channels 9*b* (see FIG. 2) in the screw connection region formed by the inner thread 7.2 and the outer thread 2.1.2 into a space 9*c* formed by the protection cap 7 and the nozzle cap 5. The space 9*c* tends to taper towards the tip of the plasma torch 1. The secondary gas SG passes a secondary gas guiding component 8 through the openings 8*a* before it passes from a space 9*d* to the plasma beam (not shown) and leaves the outlet opening 7*c* of the protection cap 7.

In contrast with the prior art, the secondary gas SG is introduced having regard to the tip of the plasma torch 1 behind the screw connection region into the space 9. Thus, cooling of the nozzle protection cap 7 is improved. The secondary gas SG cools the inner surface of the nozzle protection cap 7 over almost its entire length. This is true even though the screw connection region is cooled with limited resources through the secondary gas flow. This is particularly significant as the nozzle protection cap holder 2.1 consists of plastic and can be damaged in the event of overheating. In the secondary gas channels 9*b* formed in the screw connection region or in the thread region, the secondary gas SG flows more quickly than in the following space 9*c*, as the sum of the surfaces of the flow cross-sections is smaller than the flow cross-section of the space 9*c*. This high flow speed also improves the cooling effect. With corresponding dimensioning, the secondary gas can be set in rotation, the flow speed thus also increased in the space 9*c*, and the cooling improved.

Figure 2:
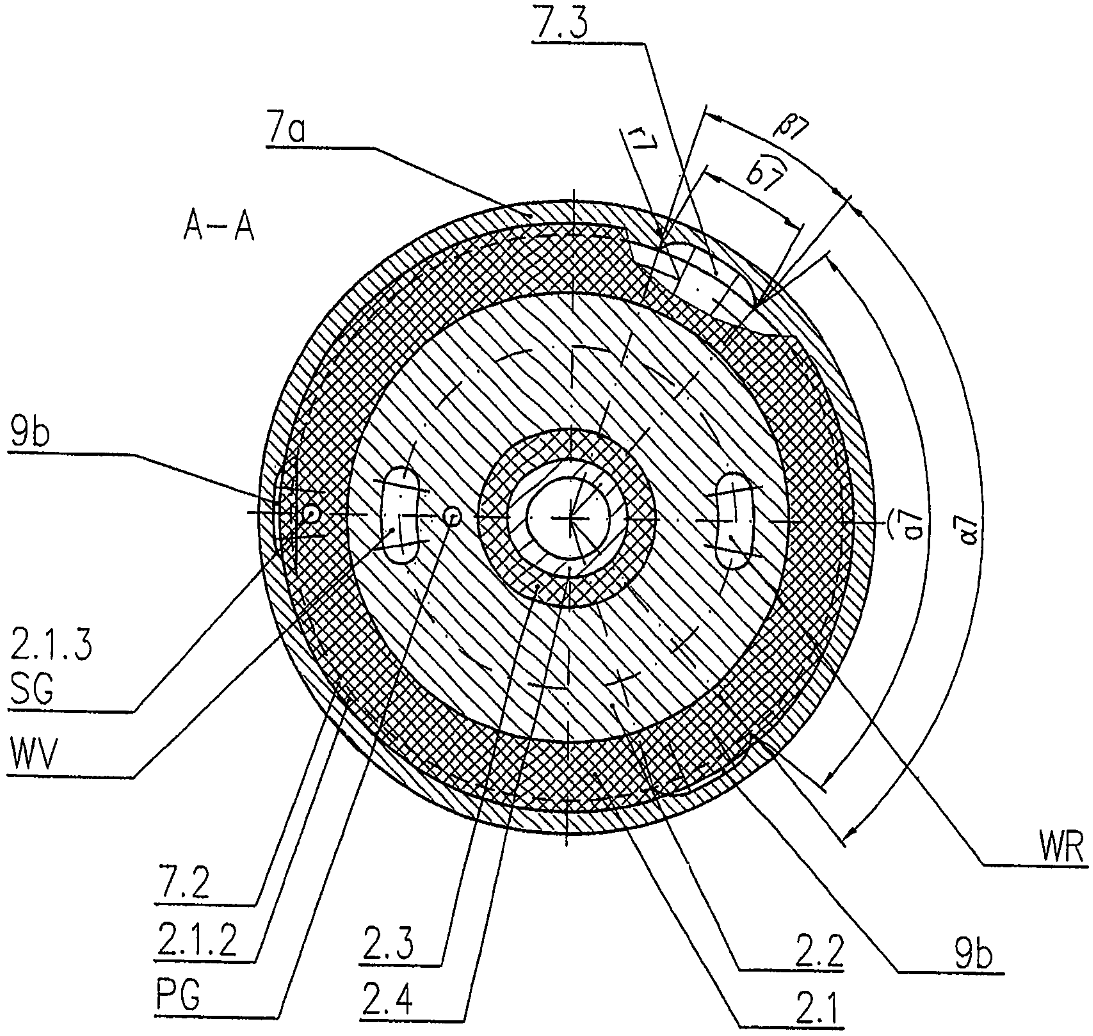
FIG. 2 depicts a sectional view along the line A-A of FIG. 1.

FIG. 2 depicts the section along the line A-A of the arc plasma torch 1 of FIG. 1. The thread 7.2 is crossed by three grooves 7.3, with one groove 7.3 being visible in FIG. 2. The grooves 7.3 are distributed here at equally great angles α 7 and thus symmetrically over the periphery. The grooves 7.3 form, with the outer surface of the outer thread 2.1.2 of the nozzle protection cap holder, the secondary gas channels 9*b*, through which the secondary gas SG flows to the tip of the arc plasma torch 1.

Figure 3:
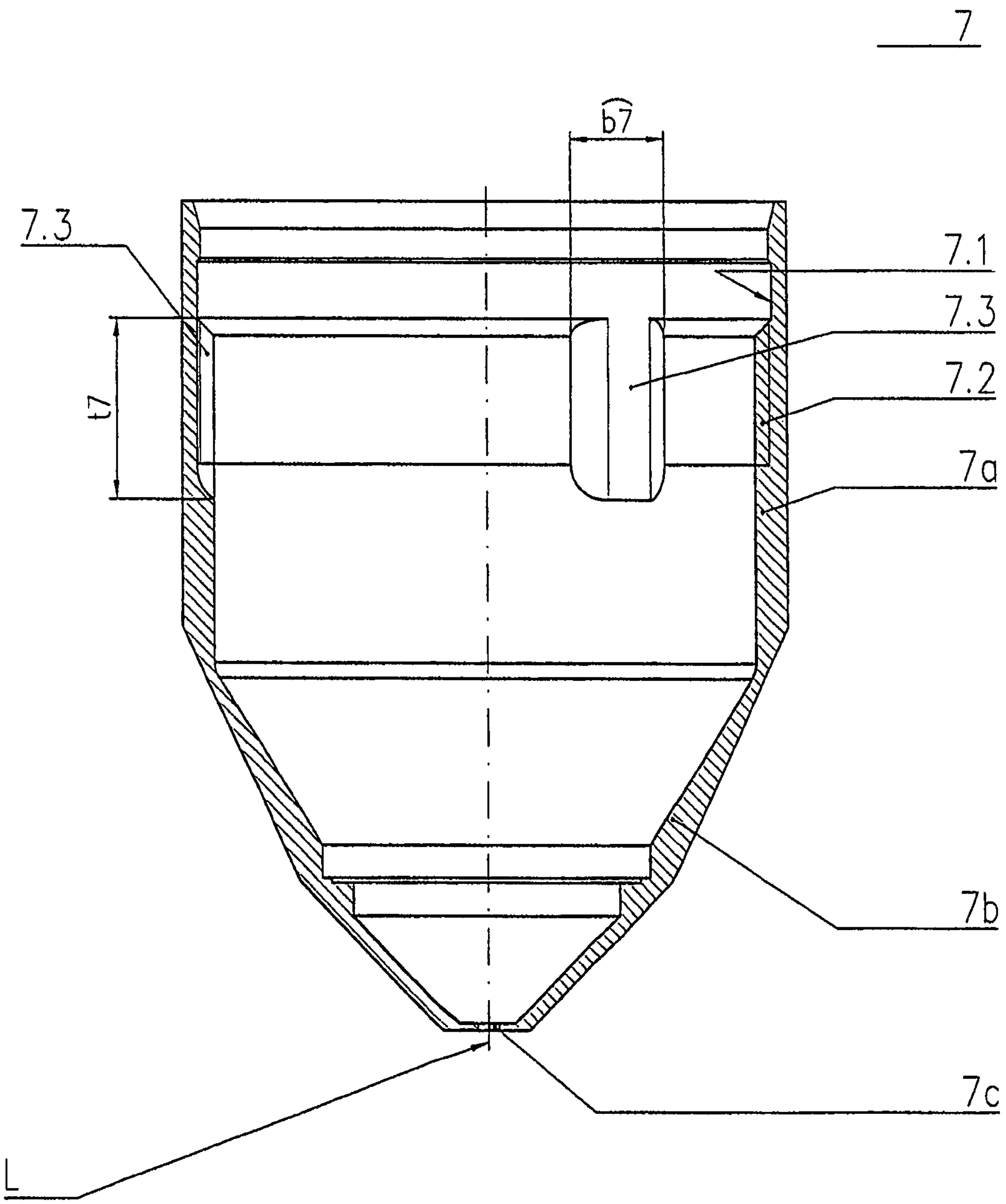
FIG. 3 depicts a longitudinal sectional view of the nozzle protection cap of the arc plasma torch of FIG. 1.

FIG. 3 depicts the nozzle protection cap 7 of FIG. 1. The nozzle protection cap 7 is designed in one part and includes the cylindrical, upwardly open, rear section 7*a* and the conically tapering front section 7*b* and outlet opening 7*c*. The thread 7.2 (inner thread) is located in the section 7*a*, in which the grooves 7.3 are incorporated, of which only one is visible, and through which the secondary gas SG flows in the assembled state.

Figure 4:
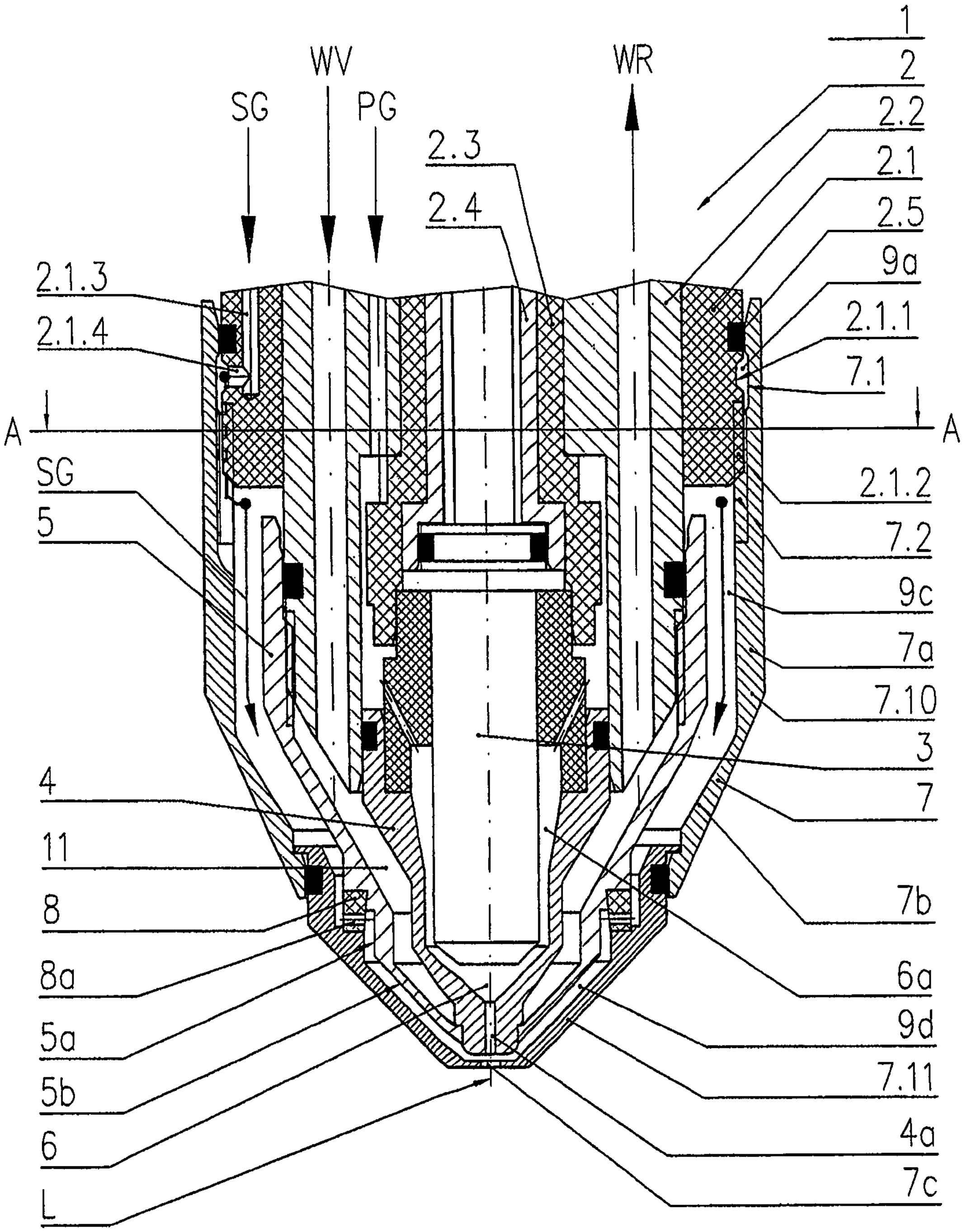
FIG. 4 depicts a longitudinal sectional view of an arc plasma torch according to one embodiment of the invention.

The embodiment depicted in FIG. 4 differs from the embodiment depicted in FIG. 1 in that the nozzle protection cap 7 consists of two components, a rear component 7.10 inserted into a front component 7.11. In the embodiment of FIG. 4, these are not identical to the sections 7*a* and 7*b* of FIG. 1, but some anticipated embodiments allow for the use of such identical sections. The heat conduction between the front component 7.11 and the rear component 7.10 takes place by means of a circular bearing surface between the two components. Sealing is achieved using an O-ring (not shown).

Figure 5:
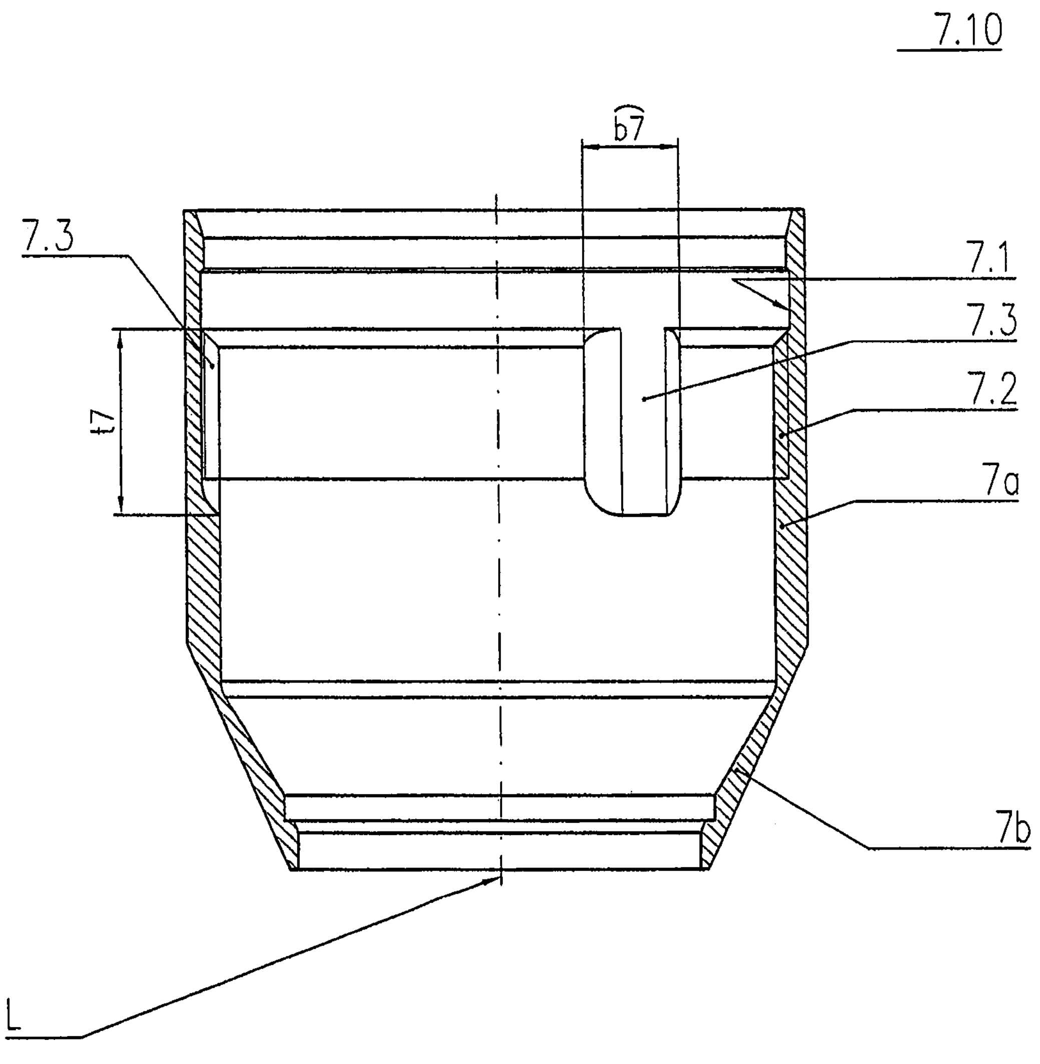
FIG. 5 depicts a longitudinal sectional view of the upper part of the nozzle protection cap of the arc plasma torch of FIG. 4.

FIG. 5 depicts the rear component 7.10 of FIG. 4 which includes a cylindrical, upwardly open section 7*a* and a part of the conically tapering section 7*b*. In the section 7*a* there is a thread 7.2 (inner thread), in which grooves 7.3 are incorporated, through which the secondary gas SG flows in the assembled state.

Figure 6:
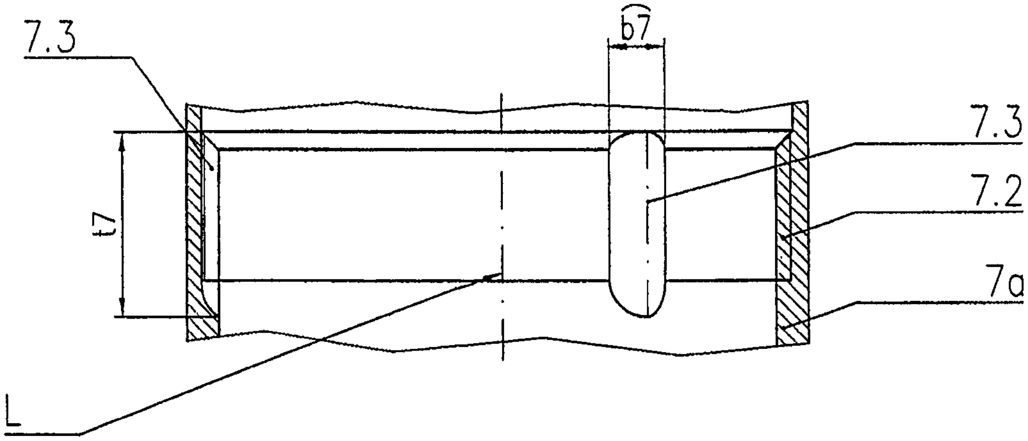
FIG. 6 depicts an embodiment of a groove according to the invention.
Figure 7:
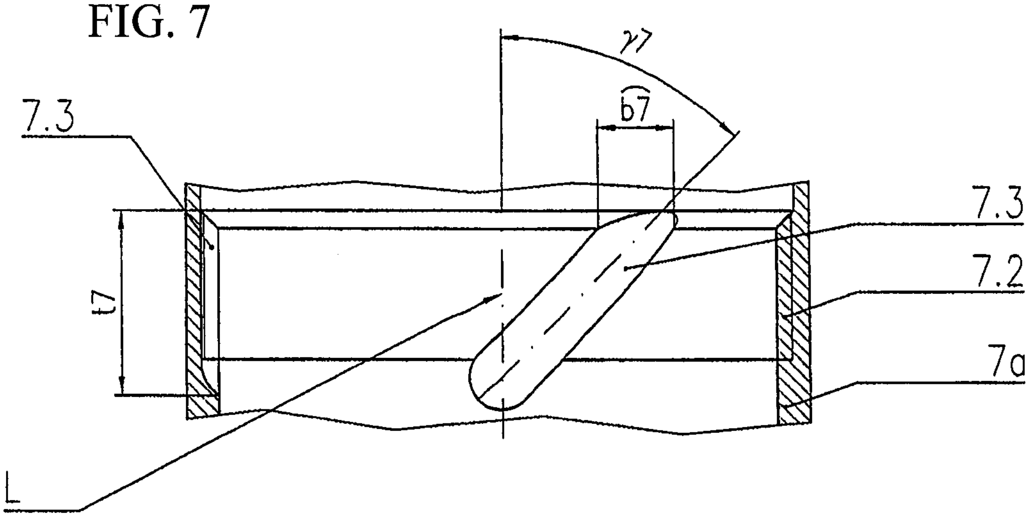
FIG. 7 depicts a further embodiment of a groove according to the invention.
Figure 8:
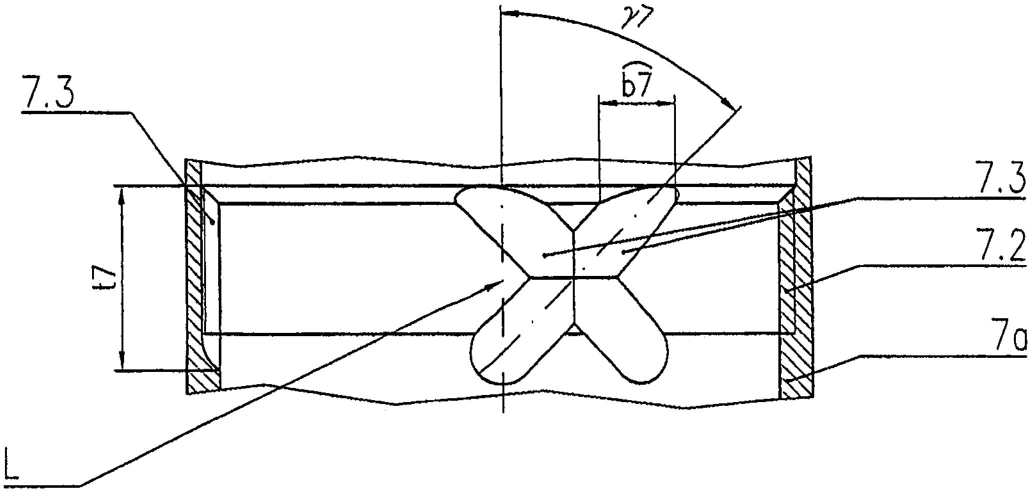
FIG. 8 depicts a further embodiment of a groove according to the invention.

FIGS. 6 to 8 depict different embodiments of the grooves 7.3 in the thread 7.2 of the rear section 7*a* of the protection cap 7.

FIG. 6 depicts a groove 7.3 lying parallel to the longitudinal axis L of the arc plasma torch 1 with the length t7 and width b7.

In FIG. 7, the groove 7.3 is inclined by 45° relative to the longitudinal axis L. The secondary gas is thereby set in rotation and flows rotating with high speed through the space 9*c*, connecting to the tip of the arc plasma torch (see FIG. 1). This improves the cooling of the nozzle protection cap 7.

FIG. 8 depicts the grooves 7.3 crossed, which leads to an especially great vorticity of the secondary gas SG and thus to the improved cooling of the protection cap 7.

Figure 9:
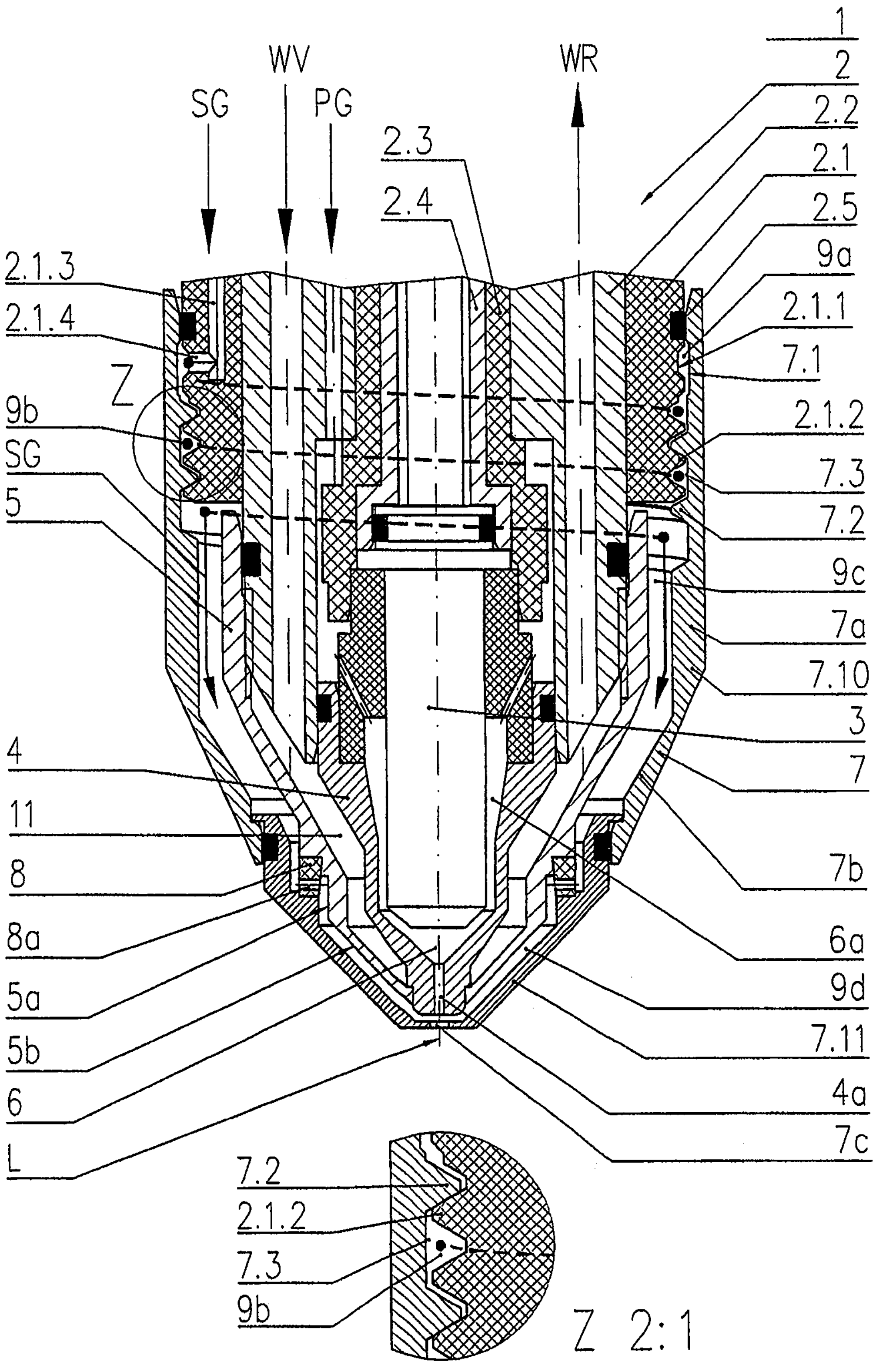
FIG. 9 depicts a longitudinal sectional view and a detailed view of an arc plasma torch according to one embodiment of the invention.

FIG. 9 depicts a further embodiment in which the nozzle protection cap 7 consists of two components, the rear component 7.10 and the front component 7.11. The secondary gas SG flows through a channel 2.1.3 and an orifice 2.1.4 from a secondary gas inlet channel perpendicularly into a circular space 9*a*, which is formed by an outer surface 2.1.1 of the nozzle protection cap holder 2.1 and an inner surface 7.1 of the nozzle protection cap 7, and is distributed. Towards the rear this space 9*a* is sealed with an O-ring 2.5. The secondary gas SG then flows through a channel 9*b* in the screw connection region, which runs parallel to the threads, into the space 9*c* formed by the nozzle protection cap 7 and the nozzle cap 5. The rotation of the secondary gas flowing into the space 9*c* is thereby increased once again.

Figure 10:
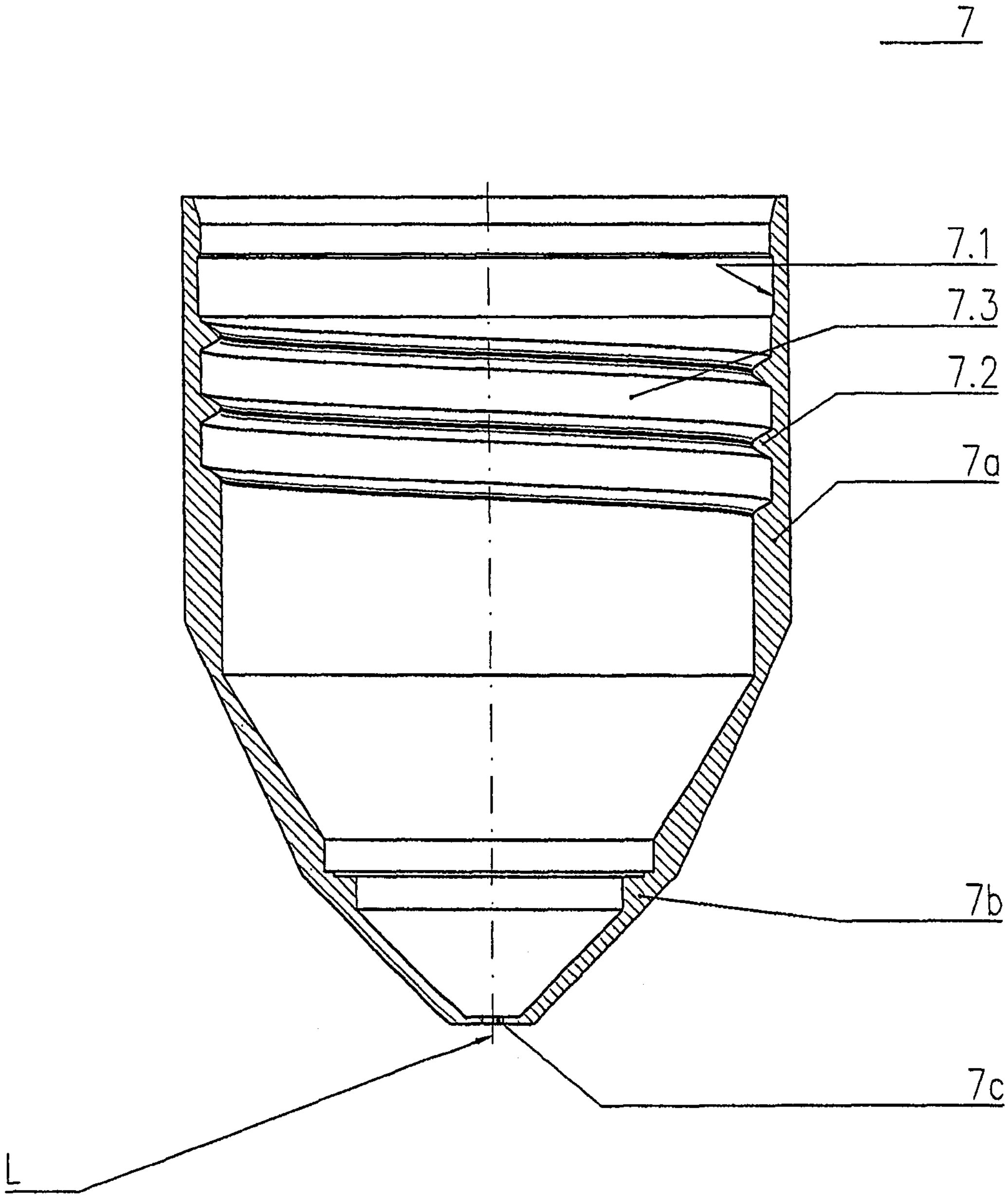
FIG. 10 depicts a longitudinal sectional view of a nozzle protection cap of the arc plasma torch of FIG. 9.

FIG. 10 depicts a nozzle protection cap which can be used in the embodiment of FIG. 9 and which consists of one component. The protection cap holder 2.1 can also comprise, for conveyance of the secondary gas SG from the channel 2.1.3, a plurality of orifices 2.1.4, instead of one orifice, the orifices 2.1.4 being distributed around the periphery of the cylindrical surface 2.1.1 and being connected to the channel 2.1.3. The orifices can be designed perpendicularly or inclined relative to the surface of the nozzle protection cap holder 2.1. The nozzle protection cap 7 can consist of one or more components 7.10, 7.11. These components can be configured identically to the sections 7*a* and 7*b* or in other configurations as appropriate. For example the rear component 7.10 can comprise the section 7*a* and a part of the section 7*b* (see FIG. 4).

In the embodiment shown and described in FIGS. 9 and 10, the outer thread of the nozzle protection cap holder 2.1 is designed as a double start thread with two parallel thread grooves and, accordingly, two parallel thread webs between the thread grooves. The inner thread of the nozzle protection cap 7 is constructed with the same thread pitch only with a single start in that the second thread web normally present with a double start thread is not present but instead forms a wider groove. The medium can flow through the wide groove in connection with the outer thread of the nozzle protection cap holder 2.1.

It is within the contemplated scope of the invention that triple start or multiple start threads can also be used. However, in such cases, the pitch significantly increases, which can potentially complicate screwing.

The features of the invention disclosed in the present description, in the drawings and in the claims can be essential both individually and in any combinations for the realization of the invention in its different embodiments.

The invention claimed is:

1. A nozzle protection cap, having a longitudinal axis, for an arc plasma torch comprising:

a front end section and a rear end section, said rear end section having an inner surface and a thread region on said inner surface for screwing into a torch body of an arc plasma torch;

at least one groove crossing said thread region obliquely to said longitudinal axis of said nozzle protection cap; and said at least one groove crossing in the manner of a screw said thread region on said inner surface.

2. The nozzle protection cap of claim 1 wherein said thread region is designed to screw into the torch body via a nozzle protection cap holder.

3. The nozzle protection cap of claim 1 further comprising:

said nozzle protection cap having a longitudinal axis; and said at least one groove crossing said thread region parallel to said longitudinal axis of said nozzle protection cap.

4. The nozzle protection cap of claim 1 having a two-part construction.

5. A nozzle protection cap holder, having a longitudinal axis, for an arc plasma torch comprising:

a section having an outer surface;

a thread region on said outer surface for screwing to a nozzle protection cap of an arc plasma torch;

at least one groove crossing said thread region obliquely to said longitudinal axis of said nozzle protection cap; and said at least one groove crossing in the manner of a screw said thread region on said outer surface.

6. The nozzle protection cap holder of claim 5 further comprising:

said nozzle protection cap having a longitudinal axis; and said at least one groove crossing said thread region parallel to said longitudinal axis of said nozzle protection cap.

7. An arc plasma torch comprising:

a torch body;

a screw connection region;

a nozzle protection cap, having a longitudinal axis, screwed into said screw connection region, said nozzle protection cap having a front end section and a rear end section, said rear end section having an inner surface and a thread region on said inner surface for screwing into said torch body at said screw connection region;

at least one groove crossing said thread region obliquely to said longitudinal axis of said nozzle protection cap;

said at least one groove crossing in the manner of a screw said thread region on said inner surface; and at least one channel is formed between said torch body and said nozzle protection cap, said channel crossing said screw connection region.

8. The arc plasma torch of claim 7 wherein said nozzle protection cap is screwed in said screw connection region via a nozzle protection cap holder into said torch body.

9. The arc plasma torch of claim 8 wherein said nozzle protection cap has a two-part construction.

10. The arc plasma torch of claim 8 wherein said nozzle protection cap holder further comprises:

a section having an outer surface;

a thread region on said outer surface for screwing into said nozzle protection cap; and at least one groove, said at least one groove crossing said thread region on said outer surface.

11. The arc plasma torch of claim 8 further comprising:

said nozzle protection cap having a longitudinal axis; and said at least one groove crossing said thread region parallel to said longitudinal axis of said nozzle protection cap.

12. The arc plasma torch of claim 8 wherein said at least one channel is formed from a groove in at least one of said torch body, said nozzle protection cap holder, and said nozzle protection cap.

13. The arc plasma torch of claim 7 wherein said channel is a secondary medium channel.

14. The arc plasma torch of claim 13 wherein said secondary medium channel is a secondary gas channel.

15. The arc plasma torch of claim 13 wherein a secondary medium inlet channel is provided in said torch body, said secondary medium inlet channel being connected to said secondary medium channel.

16. The arc plasma torch of claim 7 further comprising:

said nozzle protection cap is screwed in said screwed connection region, via a nozzle protection cap holder, into said torch body; and a secondary medium inlet channel is provided in said nozzle protection cap holder, said secondary medium inlet channel being connected to said secondary medium channel.

* * * * *